United States Patent
Hamada

(10) Patent No.: US 10,553,881 B2
(45) Date of Patent: Feb. 4, 2020

(54) FUEL CELL

(75) Inventor: Shigetaka Hamada, Nissin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 210 days.

(21) Appl. No.: 14/130,508

(22) PCT Filed: Jul. 5, 2011

(86) PCT No.: PCT/JP2011/065365
§ 371 (c)(1),
(2), (4) Date: Jan. 2, 2014

(87) PCT Pub. No.: WO2013/005300
PCT Pub. Date: Jan. 10, 2013

(65) Prior Publication Data
US 2014/0141350 A1 May 22, 2014

(51) Int. Cl.
*H01M 8/04* (2016.01)
*H01M 8/04029* (2016.01)
*H01M 8/0263* (2016.01)
*H01M 8/0265* (2016.01)
*H01M 8/0267* (2016.01)

(52) U.S. Cl.
CPC ..... *H01M 8/04029* (2013.01); *H01M 8/0263* (2013.01); *H01M 8/0265* (2013.01); *H01M 8/0267* (2013.01)

(58) Field of Classification Search
CPC .. H01M 8/04029; H01M 8/02; H01M 8/0254; H01M 8/0263; H01M 8/0265; H01M 8/0267; H01M 8/10; H01M 8/1004
See application file for complete search history.

(56) References Cited

U.S. PATENT DOCUMENTS

| | | | |
|---|---|---|---|
| 4,324,844 A | 4/1982 | Kothmann | |
| 5,503,944 A * | 4/1996 | Meyer et al. | 429/437 |
| 6,048,633 A | 4/2000 | Fujii et al. | |
| 6,248,466 B1 * | 6/2001 | Takahashi | H01M 8/0247 429/434 |
| 6,365,295 B1 | 4/2002 | Matsukawa et al. | |
| 6,420,061 B1 | 7/2002 | Fujii et al. | |

(Continued)

FOREIGN PATENT DOCUMENTS

| | | |
|---|---|---|
| CN | 101849310 A | 9/2010 |
| JP | H06267564 A | 9/1994 |

(Continued)

*Primary Examiner* — Helen Oi K Conley
(74) *Attorney, Agent, or Firm* — Hunton Andrews Kurth LLP

(57) ABSTRACT

Provided is a fuel cell, the output voltage of which is improved by making a membrane moist state uniform. An anode-side gas diffusion layer and a cathode-side gas diffusion layer are joined to a membrane electrode assembly, and a separator is joined to the anode-side gas diffusion layer. The separator has a recess portion and a protrusion portion formed to constitute a gas flow path and a refrigerant flow path, respectively. The cross-sectional area of the recess portion is made relatively small at the downstream side in comparison with that at the upstream side, and the cross-sectional area of the protrusion portion is made relatively large at the downstream side in comparison with that at the upstream side, thereby improving the moist state.

5 Claims, 5 Drawing Sheets

(56) References Cited

U.S. PATENT DOCUMENTS

| | | | |
|---|---|---|---|
| 6,866,955 B2* | 3/2005 | Lee | F28F 3/048 |
| | | | 429/437 |
| 2002/0102453 A1* | 8/2002 | Suenaga | H01M 8/0273 |
| | | | 429/465 |
| 2003/0077501 A1* | 4/2003 | Knights | H01M 4/8626 |
| | | | 429/435 |
| 2004/0023099 A1* | 2/2004 | Akiyama et al. | 429/34 |
| 2004/0110049 A1* | 6/2004 | Shimotori et al. | 429/25 |
| 2004/0161658 A1 | 8/2004 | Mizuno | |
| 2005/0130003 A1 | 6/2005 | Lee et al. | |
| 2006/0204808 A1* | 9/2006 | Takada et al. | 429/26 |
| 2007/0020504 A1 | 1/2007 | Sugita et al. | |
| 2007/0154747 A1 | 7/2007 | Darling et al. | |
| 2007/0298308 A1 | 12/2007 | Yamamoto et al. | |
| 2008/0085438 A1 | 4/2008 | Sugita et al. | |
| 2010/0239957 A1 | 9/2010 | Yamamoto et al. | |
| 2011/0097638 A1 | 4/2011 | Goto et al. | |
| 2011/0165493 A1 | 7/2011 | Okanishi et al. | |
| 2013/0052551 A1 | 2/2013 | Ishikawa | |

FOREIGN PATENT DOCUMENTS

| | | | | |
|---|---|---|---|---|
| JP | 11-154523 A | | 6/1999 | |
| JP | 2000223137 A | | 8/2000 | |
| JP | 2001-143725 A | | 5/2001 | |
| JP | 2004-039540 | * | 2/2004 | H01M 8/02 |
| JP | 2004-247154 A | | 9/2004 | |
| JP | 2008-097891 A | | 4/2008 | |
| JP | 2009-277557 A | | 11/2009 | |
| WO | 2010029758 A1 | | 3/2010 | |

* cited by examiner

|  | COMPARATIVE EXAMPLE | | EMBODIMENT | |
|---|---|---|---|---|
|  | GAS | COOLING WATER | GAS | COOLING WATER |
| UPSTREAM SEGMENT | A/(P−A) | (P−A)/A | (A+α)/(P−A−α) | (A−α)/(P−A+α) |
| MIDSTREAM SEGMENT | A/(P−A) | (P−A)/A | A/(P−A) | (P−A)/A |
| DOWN-STREAM SEGMENT | A/(P−A) | (P−A)/A | (A−α)/(P−A+α) | (A+α)/(P−A−α) |

FIG. 4

|  | COMPARATIVE EXAMPLE | | EMBODIMENT | |
|---|---|---|---|---|
|  | GAS | COOLING WATER | GAS | COOLING WATER |
| UPSTREAM SEGMENT | 1.12/0.42 | 0.42/1.12 | 1.20/0.34 | 0.34/1.20 |
| MIDSTREAM SEGMENT | 1.12/0.42 | 0.42/1.12 | 1.12/0.42 | 0.42/1.12 |
| DOWN-STREAM SEGMENT | 1.12/0.42 | 0.42/1.12 | 1.04/0.50 | 0.50/1.04 |

FIG. 5

FUEL CELL

CROSS-REFERENCE TO RELATED APPLICATIONS

This is a national phase application based on the PCT International Patent Application No. PCT/JP2011/065365 filed on Jul. 5, 2011, the entire contents of which are incorporated herein by reference.

TECHNICAL FIELD

The present invention relates to a fuel cell, and particular to a structure of a separator.

BACKGROUND ART

In a polymer electrolyte fuel cell, a cell is formed as a minimum unit by sandwiching a membrane electrode assembly (MEA), which is composed of a fuel electrode and an air electrode sandwiching an electrolyte membrane formed of a polymer electrolyte membrane, with two separators, and a plurality of cells are stacked to form a fuel cell stack, which can provide high output.

The mechanism for electric power generation employed by the polymer electrolyte fuel cell is well known, and in a nutshell, fuel gas, such as hydrogen-containing gas, is supplied to the fuel electrode (i.e., anode-side electrode), and oxidant gas, such as a gas mainly containing oxygen and air, is supplied to the air electrode (i.e., a cathode-side electrode). The hydrogen-containing gas is supplied to the anode-side electrode through a fuel gas flow passage, and is dissociated into electrons and hydrogen ions by the action of a catalyst of the electrode. The electrons move to the cathode-side electrode through an external circuit. Meanwhile, the hydrogen ions pass through the electrolyte membrane and reach the cathode-side electrode, where the hydrogen ions bond to oxygen and the electrons passing through the external circuit, to thereby produce reaction water. The heat generated by the bonding reaction of hydrogen with oxygen and electrons is recovered by means of cooling water. Further, water generated in the cathode-side electrode (which will hereinafter be referred to as "generated water") is drained from the cathode side.

Both of the anode-side electrode and the cathode-side electrode of the fuel cell are formed of catalyst layers, and these catalyst layers include stacks of gas diffusion layers for diffusing hydrogen-containing gas and oxidant gas, respectively. If the drainage of the generated water generated by the above-described reaction is interrupted in the flow passage on the cathode side, a clogging phenomenon ("flooding phenomenon") may occur in the cathode-side electrode. More specifically, if the drainage of the generated water is interrupted in the cathode-side flow passage, the cathode-side flow passage is narrowed by the generated water. This may increase the passage resistance in the cathode-side flow passage, and thus may cause reduction of electric power generation output.

The below-described Patent Document 1 discloses that, with the aim of overcoming the interruption of gas diffusibility and the deterioration of drainage, a flow passage forming member which forms a flow passage for passing supplied gas therethrough is formed of a plurality of communication segments, and that the further the segments are located on the supplied gas downstream side, the narrower the flow passage widths of the segments become.

CITATION LIST

Patent Document

Patent Document 1: JP 2001-143725 A

SUMMARY OF THE INVENTION

Technical Problem

There has been proposed a press separator which is formed by, for example, pressing one metal plate to have convex and concave shapes in an inverted manner on the front and back surfaces thereof, and supplying a hydrogen-containing gas to a concave portion. Cooling water is supplied to a convex portion of the press separator, that is the concave portion on the back surface, to thereby cool an MEA. In other words, the gas flow passage and the cooling water flow passage are configured as the front side and the back side of the same separator. Although, in such a press separator, the gas flow passage and the cooling water flow passage can be formed as the front side and the back side of the press separator, and thus the structure can be simplified, a wet state in cells of the fuel cell tends to be uneven. In particular, when temperature is high, a gas downstream portion tends to be dry. More specifically, because the generated water is produced on the cathode side, moisture on the anode gas upstream side becomes relatively high by circulating this generated water from the cathode side to the anode side. However, because pressure loss is larger on the anode gas upstream side, and moisture does not move to the downstream side, the anode gas downstream side tends to be dry (dries-up). Such unevenness in the wet state may also occur in any separators other than the press separator.

The object of the present invention is to provide a fuel cell that can improve a wet state and thus increase output voltage even if a separator on which a gas flow passage and a coolant flow passage for cooling water or the like are provided as the front and back sides thereof is employed.

Solution to Problem

The present invention relates to a fuel cell which has a membrane electrode assembly, and a separator located on one side of the membrane electrode assembly, the separator having concave and convex shapes formed on a front side and a back side of the separator, the separator having a gas flow passage formed as a concave portion on the membrane electrode assembly side and a coolant flow passage formed as a concave portion on the side opposite to membrane electrode assembly, and, in this fuel cell, a cross-sectional area of the concave portion constituting the gas flow passage of the separator is set such that it becomes relatively smaller on a gas downstream side than on a gas upstream side, and a cross-sectional area of the concave portion constituting the coolant flow passage of the separator is set such that it becomes relatively larger on a coolant downstream side than on a coolant upstream side.

According to an embodiment of the present invention, the gas flow passage is a straight flow passage with a gas inlet and a gas outlet that are disposed on a straight line.

According to another embodiment of the present invention, the gas flow passage is a serpentine flow passage.

According to still another embodiment of the present invention, the gas flow passage is a serpentine flow passage, and the coolant flow passage is a straight flow passage.

Advantageous Effects of Invention

With the present invention, it is possible to improve a wet state and increase output voltage.

BRIEF DESCRIPTION OF DRAWINGS

FIG. 4 shows a table illustrating ratios between the embodiment and a comparative example.

FIG. 5 shows a table illustrating ratios between the embodiment and the comparative example.

DESCRIPTION OF EMBODIMENT

Figure 1:
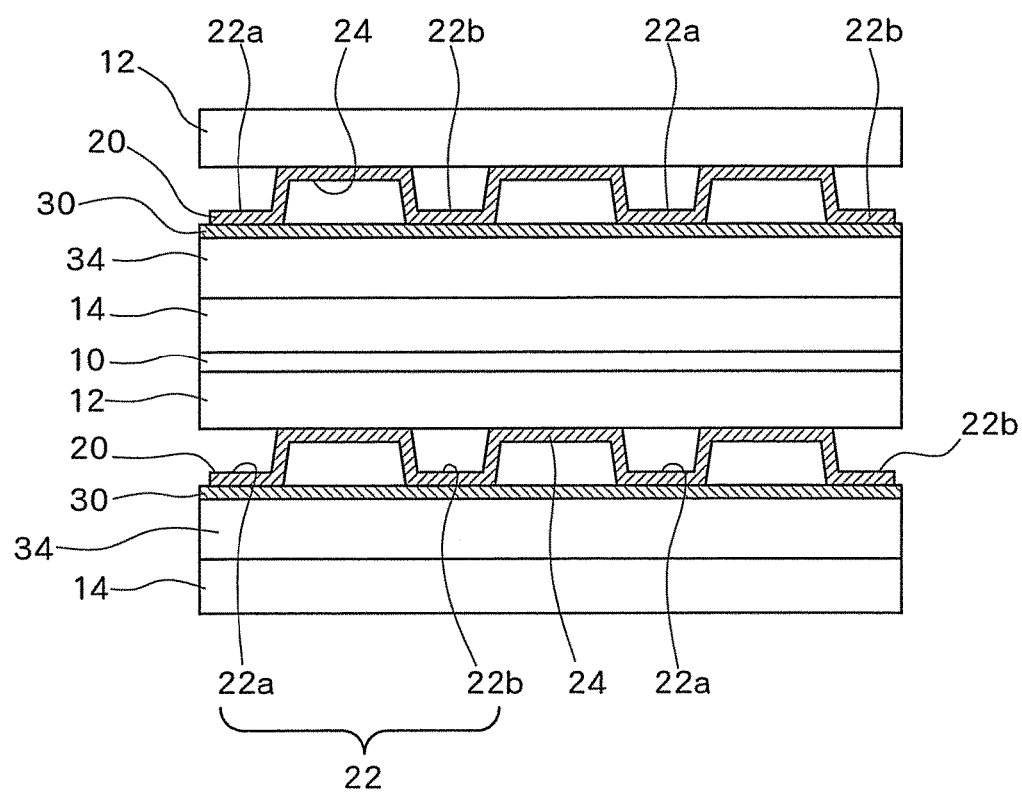
FIG. 1 shows a configuration diagram of a fuel cell according to an embodiment.

An embodiment of the present invention will be described below based on the drawings. However, the embodiment below is an example, and the present invention is not limited to this embodiment.

A basic structure and a basic principle of the present embodiment will first be described.

A fuel cell according to the present embodiment has an MEA, an anode-side gas diffusion layer, and a cathode-side gas diffusion layer, and a separator having a convex and a concave formed as the front and back sides thereof is joined to the anode-side gas diffusion layer. Because the separator is formed by pressing, it is referred to as a "press separator", when necessary. A concave portion of the anode-side gas diffusion layer of the press separator functions as a gas flow passage and is supplied with hydrogen gas as a reactant gas. In addition, a convex portion adjacent to the concave portion, which is a concave portion on the back surface, functions as a coolant flow passage and is supplied with cooling water.

Although the concave portion of the press separator is supplied with hydrogen gas, the gas flow rate becomes low downstream of the concave portion, and the drainage decreases. When temperature is low, the generated water is accumulated and may cause flooding. Conversely, when temperature is high, the concave portion becomes dry, and drying-up may occur.

Therefore, in the present embodiment, a press separator on which convex and concave portions are formed as the front and back sides thereof is employed, and the width of the concave portion and a cross-sectional area of the convex portion (flow passage cross-sectional area) are not maintained to be constant, but are changed along the gas flow passage. The concave portion has a relatively smaller cross-sectional area on the downstream side compared to the upstream side, while the convex portion has a relatively larger cross-sectional area on the downstream side compared to the upstream side.

When the size of the cross-sectional area of the concave portion on the downstream side is made relatively smaller than that on the upstream side, that is, when the cross-sectional area on the upstream side is relatively larger, pressure loss in the gas flow passage becomes smaller compared to when such a structure is not employed, and thus the generated water is caused to move from the upstream side to the downstream side, thereby suppressing accumulation of the generated water and improving the wet state. Although the generated water is produced on the cathode side, if the flow directions of the gas flow passage on the anode side and the gas flow passage of the cathode side are opposite to each other, and if the upstream side of the gas flow passage on the anode side corresponds to the downstream side of the gas flow passage on the cathode side, and the downstream side of the gas flow passage on the anode side corresponds to the upstream side of the gas flow passage on the cathode side, the generated water is delivered to the downstream side of the gas flow passage on the cathode side along the gas flow passage on the cathode side, and then delivered to the upstream side of the anode side via a electrolyte membrane. The generated water is circulated in this manner, and the amount of the generated water is relatively larger on the upstream side of the gas flow passage on the anode side. However, because, in the present embodiment, the width on the upstream side of the gas flow passage is set to be relatively larger to reduce pressure loss, the generated water circulated from the cathode side is quickly delivered to the downstream side, thereby improving the wet state.

Further, if the cross-sectional area of the convex portion on the downstream side is relatively larger than that of the upstream side, a contact area or the contact rate between the anode-side gas diffusion layer and the convex portion becomes relatively larger on the downstream side, and thus, the heat transfer efficiency increases on the downstream side accordingly. Therefore, even when temperature is high, it is possible to remove heat from the downstream side and cool it efficiently, thereby suppressing drying of the downstream side and thus suppressing dry-up, even when the temperature is high.

In the present embodiment, the wet state of the membrane is improved by adjusting the cross-sectional area of the concave portion and the cross-sectional area of the convex portion of the separator, that is, by adjusting both of the cross-sectional area of the gas flow passage and the cross-sectional area of the cooling water flow passage.

Next, a fuel cell according to the present embodiment will be specifically described.

FIG. 1 shows a cross-sectional configuration of a fuel cell according to the present embodiment. The fuel cell is configured by sequentially laminating a separator 20, a separator 30, a porous body layer 34, a gas diffusion sheet 14, an MEA 10, a gas diffusion sheet 12, a separator 20, and a separator 30. The gas diffusion sheet 12, the separator 20, and the separator 30 are provided on the anode side, while the gas diffusion sheet 14 and the porous body layer 34 are provided on the cathode side. The gas diffusion sheet 14, the MEA 10, and the gas diffusion sheet 12 are joined to form an MEGA.

The separators 20 and the separators 30 have a rectangular outer shape and are provided with a plurality of through-holes on the circumferential side which form various manifolds. The separator 20 is formed by pressing a single metal plate and has convex and concave shapes as the front and back sides thereof in an inverted manner. Concave portions 22a are supplied with high-pressure hydrogen gas via the manifolds formed by the through-holes provided on the circumferential side of the separator 20. Further, concave portions 22b are connected to an anode gas exhaust system via the manifolds formed by the other through-holes provided on the circumferential side of the separator 20. In this course of flow, hydrogen is supplied to anode-side electrode catalyst layers of the gas diffusion sheet 12 to the MEA 10.

In addition, the convex portions 24 of the separator 20 function, together with the separator 30, as coolant flow passages through which a coolant such as cooling water flows.

The gas flow passage formed by the concave portion 22 is composed of a plurality of segments from a gas inlet to a gas outlet, such as three segments, and these segments are continuously connected via sharp curves and form a serpentine flow passage.

Figure 2:
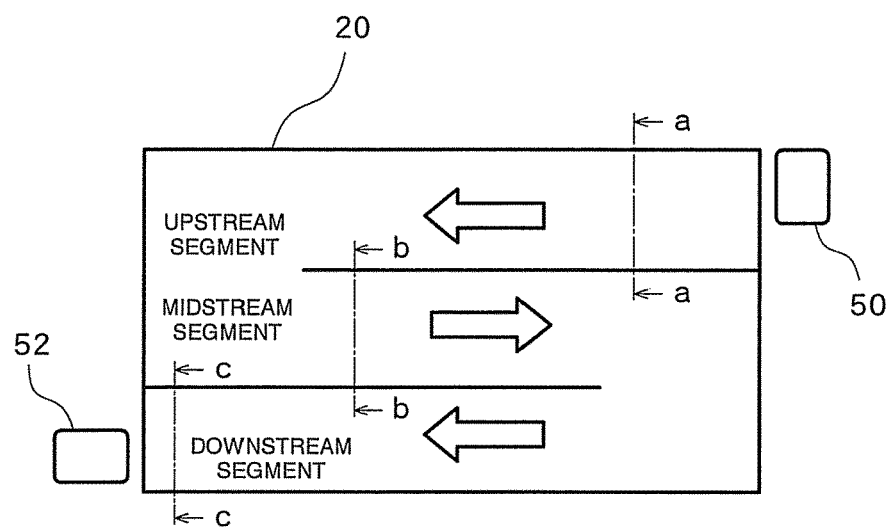
FIG. 2 shows a schematic diagram of a gas flow passage according to the embodiment.

FIG. 2 schematically shows a serpentine flow passage. The gas flow passage is composed of three segments, namely upstream, midstream, and downstream segments. The upstream and midstream segments are connected via a U-shape curve, and the midstream and downstream segments are also connected via a U-shape curve. As illustrated by the arrows in the figure, in this figure, gas in the upstream segment flows from right to left; gas in the midstream segment flows from left to right; and gas in the downstream segment flows from right to left, like in the upstream segment. Hydrogen gas supplied via a hydrogen inlet 50 provided on the circumferential side of the separator 20 flows from the upstream segment, to the midstream segment, and the downstream segment in this order, and is discharged from a hydrogen outlet 52 provided on the opposite side to the hydrogen inlet 50 on the circumferential side of the separator 20.

Figure 3:
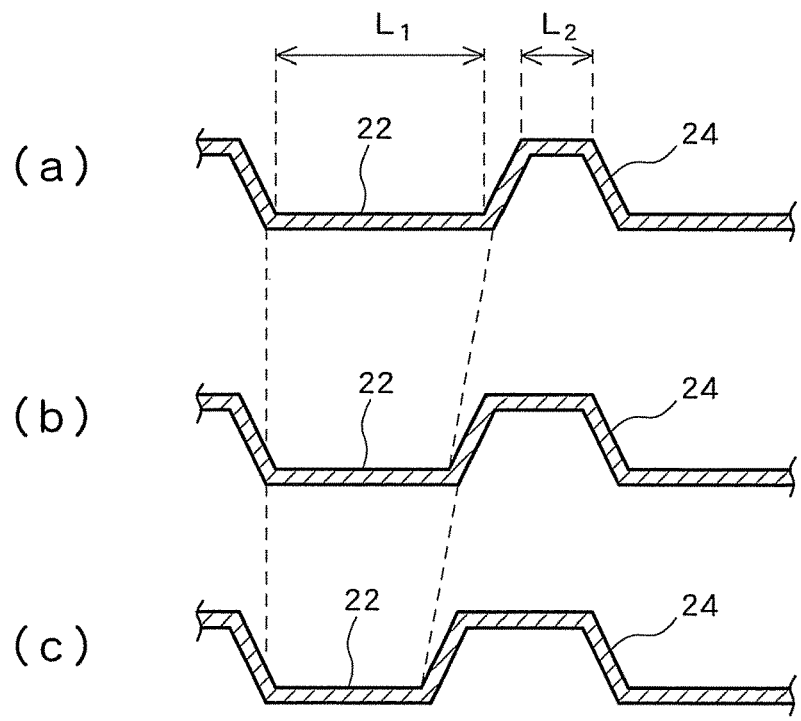
FIG. 3 shows cross sections taken along a-a, b-b, and c-c of FIG. 2.

FIG. 3 shows schematic cross-sections in the upstream, midstream, and downstream segments of FIG. 2. FIG. 3(a) shows a cross section of FIG. 2 taken along a-a, which includes cross sections of the concave portion 22 and the convex portion 24 in the upstream segment. FIG. 3(b) shows a cross section of FIG. 2 taken along b-b, which includes cross sections of the concave portion 22 and the convex portion 24 in the midstream segment. FIG. 3(c) shows a cross section of FIG. 2 taken along c-c, which includes cross sections of the concave portion 22 and the convex portion 24 in the downstream segment.

Assuming that the width of the concave portion 22 is L1 and that the width of the convex portion 24 is L2, the width L1 of the concave portion 22 becomes larger moving upstream, and becomes smaller moving downstream. More specifically, assuming that L1 of the upstream segment is L1 (upstream), L1 of the midstream segment is L1 (midstream), and that L1 of the downstream segment is L1 (downstream), the widths are formed so as to satisfy the following relationship:

$$L1(\text{upstream}) > L1(\text{midstream}) > L1(\text{downstream})$$

Because the depth of the concave portion 22 is constant, and the cross-sectional area of the gas flow passage is defined by width*depth, assuming that a cross-sectional area of the upstream segment is S1 (upstream), a cross-sectional area of the midstream segment is S1 (midstream), and that a cross-sectional area of the downstream segment is S1 (downstream), there is the following relationship:

$$S1(\text{upstream}) > S1(\text{midstream}) > S1(\text{downstream})$$

Further, contrary to L1, the width L2 of the convex portion 24 becomes smaller moving upstream and becomes larger moving downstream. More specifically, assuming that L2 of the upstream segment is L2 (upstream), L2 of the midstream segment is L2 (midstream), and that L2 of the downstream segment is L2 (downstream), the widths are formed so as to satisfy the following relationship:

$$L2(\text{upstream}) < L2(\text{midstream}) < L2(\text{downstream})$$

Similarly, because the height of the convex portion 24, which is the depth of the concave portion on the back side, is constant, and a cross-sectional area of the cooling water flow passage is defined by width*depth, assuming that a cross-sectional area of the upstream segment is S2 (upstream), a cross-sectional area of the midstream segment is S2 (midstream), and that a cross-sectional area of the downstream segment is S2 (downstream), there is the following relationship:

$$S2(\text{upstream}) < S2(\text{midstream}) < S2(\text{downstream})$$

In other words, if the width L1 of the concave portion 22 in the midstream segment is used as a reference, the width L1 of the concave portion 22 in the upstream segment is made larger than that of the midstream segment by a predetermined amount, and the width L1 of the concave portion 22 in the downstream segment is made smaller than that of the midstream segment by a predetermined amount. Further, if the width L2 of the convex portion 24 in the midstream segment is used as a reference, the width L2 of the convex portion 24 in the upstream segment is made larger than that of the midstream segment by a predetermined amount, and the width L2 of the convex portion 24 in the downstream segment is made smaller than that of the midstream segment by a predetermined amount.

More specifically, in FIG. 3(a), FIG. 3(b), and FIG. 3(c), a sum of the width L1 of the concave portion 22 and the width L2 of the convex portion 24, that is, a pitch P=L1+L2, is constant. In other words, the width L1 of the concave portion 22 and the width L2 of the convex portion 24 are changed in the upstream segment, the midstream segment, and the downstream segment, while maintaining a constant pitch of the concave portion 22 and the convex portion 24.

FIG. 4 shows a table comparing the present embodiment with a comparative example in which the width of the concave portion 22 and the width of the convex portion 24 are constant in the upstream segment, the midstream segment, and the downstream segment. This table illustrates ratios between the width of the concave portion 22 and the width of the convex portion 24 separately for each of the gas flow passage and the cooling water flow passage. For the gas flow passage, the ratio is shown as (the width of the concave portion 22/the width of the convex portion 24), while for the cooling water flow passage, the ratio is shown as (the width of the convex portion 24/the width of the concave portion 22). If the width of the concave portion 22 in the midstream segment is used as a reference, and a pitch is P, in the midstream segment, both the comparative example and the present embodiment have the same ratio of the gas flow passage, A/(P−A), and the same ratio of the cooling water flow passage, (P−A)/A. In the comparative example, this ratio does not change in the upstream segment and the downstream segment, and is constant. On the other hand, in the present embodiment, because the width of the concave portion 22 becomes larger in the upstream segment by a predetermined amount α, the ratio of the gas flow passage becomes (A+α)/(P−A−α), and the ratio of the cooling water flow passage becomes (A−α)/(P−A+α). Further, because the width of the concave portion 22 becomes smaller in the downstream segment by a predetermined amount α, the ratio of the gas flow passage becomes (A−α)/(P−A+α), and the ratio of the cooling water flow passage becomes (A+α)/(P−A−α).

Alternatively, assuming that the width of the convex portion 24 in the midstream segment is B, and that a predetermined amount is β, the ratio of the gas flow passage is A/B, and the ratio of the cooling water flow passage is B/A in all of the upstream segment, midstream segment, and downstream segment in the comparative example. Meanwhile, in the present embodiment, the ratios of the gas flow passage may be (A+α)/(B−β) in the upstream segment, A/B in the midstream segment, and (A−α)/(B−β) in the downstream segment, and the ratios of the cooling water flow passage may be (B−β)/(A+α) in the upstream segment, B/A in the midstream segment, and (B+β)/(A−α) in the downstream segment. α and β may be or may not be identical. If α and β are identical, the pitch is constant, while if α and β are different, the pitch changes.

FIG. 5 shows a specific example based on the table in FIG. 4, in which α in FIG. 4 is set at 0.08 mm. In all of the upstream segment, midstream segment, and downstream segment in the comparative example, the ratio of the gas flow passage is 1.12 (mm)/0.42 (mm), and the ratio of the cooling water flow passage is 0.42/1.12. Meanwhile, in the present embodiment, the ratio of the gas flow passage changes from 1.20/0.34 in the upstream segment to 1.12/0.42 in the midstream segment, and 1.04/0.50 in the downstream segment. If the ratio in the midstream segment is used as a reference, the ratio in the upstream segment increases compared to that of the midstream segment, while the ratio in the downstream segment decreases compared to that of the midstream segment. Further, the ratio of the cooling water flow passage changes from 0.34/1.20 in the upstream segment to 0.42/1.12 in the midstream segment, and 0.50/1.04 in the downstream segment. If the ratio in the midstream segment is used as a reference, the ratio in the upstream segment decreases compared to that of the midstream segment, while the ratio in the downstream segment increases compared to that of the midstream segment. The comparative example and the present embodiment use the same ratio in the midstream segment.

As such, by forming the width L1 of the concave portion 22 such that L1 (upstream)>L1 (midstream)>L1 (downstream), gas pressure loss decreases in the upstream segment, and the gas flow rate increases in the downstream segment. Thus, moisture is allowed to move from the upstream segment to the downstream segment, thereby suppressing drying even when temperature is high. Further, because the gas flow rate increases in the downstream segment even when the temperature is low, the drainage is ensured, thereby suppressing flooding.

Further, by forming the width L2 of the convex portion 24 such that L2 (upstream)<L2 (midstream)<L2 (downstream), a contact area or the contact rate between the separator 20 and the gas diffusion layer 12 in the downstream segment increases, and the heat transfer efficiency increases, thereby suppressing drying and thus drying-up in the downstream segment when temperature is high. The flooding and the drying-up greatly affect output voltage of the fuel cell. In the present embodiment, these flooding and drying-up are suppressed, and output voltage of the fuel cell increases.

Figure 6:
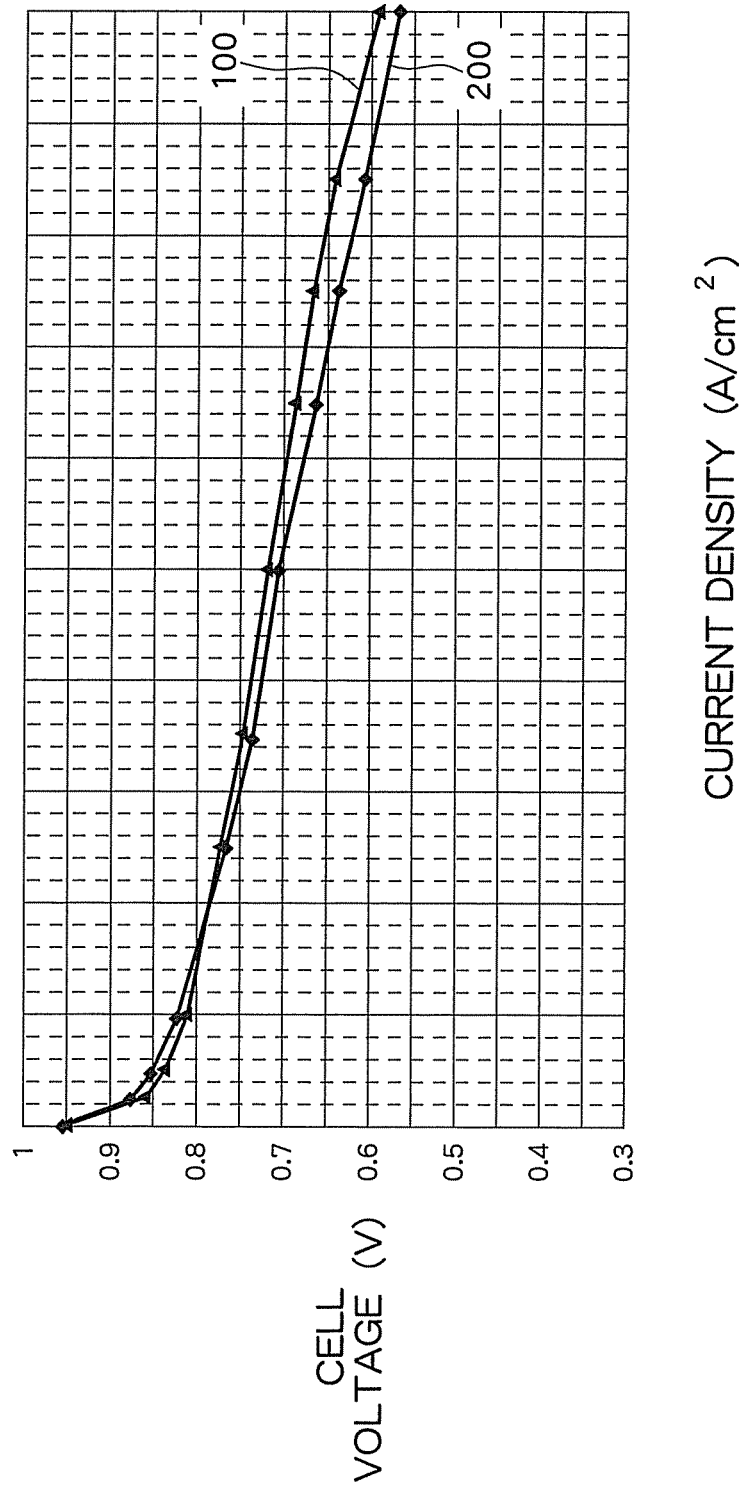
FIG. 6 shows a graph illustrating cell voltage changes between the embodiment and the comparative example.

FIG. 6 shows cell voltage characteristics of the fuel cells of the comparative example and the present embodiment. In the figure, the lateral axis indicates the current density, and the vertical axis indicates average cell voltage. Further, in the figure, a line 100 indicates cell voltage of the present embodiment, and a line 200 indicates cell voltage of the comparative example. When the current density is low, the comparative example and the present embodiment have almost the same cell voltage. However, as the current density increases, the cell voltage of the present embodiment becomes larger than that of the comparative example. This is because, in the present embodiment, there is a uniform membrane wet state throughout the gas flow passage, and in particular, drying is suppressed on the downstream side when output is high.

Figure 7:
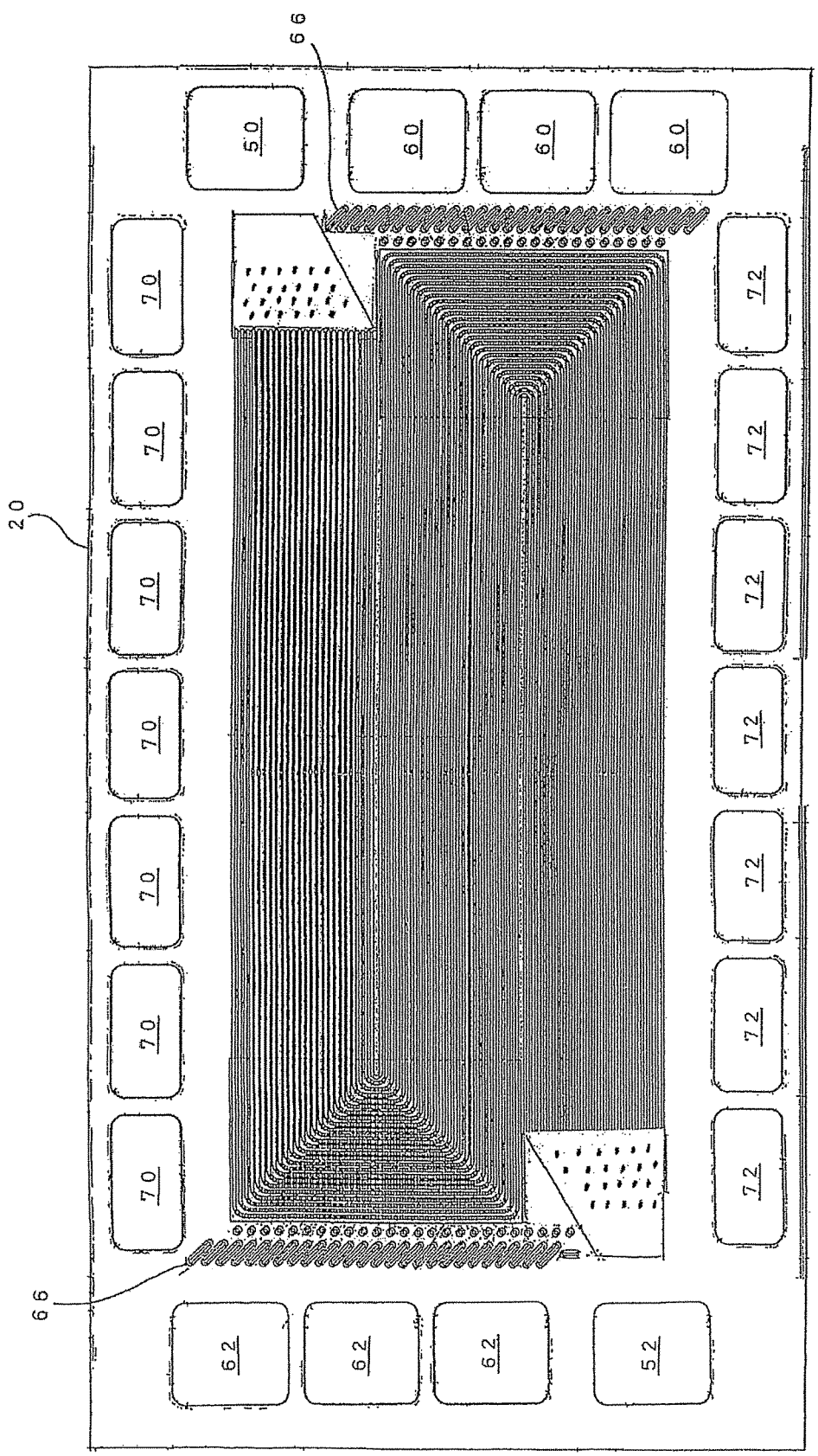
FIG. 7 shows a plane view of a separator according to the embodiment.

FIG. 7 shows a specific structure of the separator 20 of the present embodiment. The separator 20 has a rectangular shape as a whole, and a gas flow passage, which is formed of the concave portion among the convex and concave portions formed as the front and back sides of the separator, has three segments, that is, the upstream segment, midstream segment, and downstream segment. In this figure, the upstream segment, the midstream segment, and the downstream segment are formed in this order from above. Hydrogen gas inlet/outlet manifolds 50 and 52 and cooling water inlet/outlet manifolds 60 and 62 are formed on the right and left circumferential portions of the separator 20. Specifically, the hydrogen inlet manifold 50 and three cooling water inlet manifolds 60 are formed in this order from the top of the right circumferential portion of the separator 20. On the left circumferential portion, there are four manifolds in total, that is, three cooling water outlet manifolds 62 and a hydrogen gas outlet manifold 52, are formed in this order from above. Hydrogen gas is supplied from an external hydrogen tank via a regulator or an injector through the hydrogen inlet manifold 50 of the right circumferential portion of the separator 20. A hydrogen gas pipe extends from a hydrogen tank to the fuel cell stack side and is connected to the hydrogen gas inlet manifold 50 through the inside of the end plate of the fuel cell stack. Hydrogen gas flows into the upstream segment of the gas flow passage from the gas inlet on the upper right end in the figure.

Hydrogen gas flows through the upstream segment of the gas flow passage, which is the serpentine flow passage, from right to left in the figure, and flows into the midstream segment while turning at the left end. Hydrogen gas then flows through the midstream segment of the gas flow passage from left to right in the figure, and flows into the downstream segment while turning at the right end. Hydrogen gas further flows through the downstream segment of the gas flow passage from right to left in the figure, and is discharged as off gas from a gas outlet via the hydrogen gas outlet manifold 52 of the left circumferential portion of the separator 20. Hydrogen gas discharged as off gas is subjected to moisture removal by a gas-liquid separation machine and then supplied to the upstream segment of the gas flow passage again using a circulation pump.

On the other hand, the cooling water is supplied from the cooling water inlet manifold 60 of the right circumferential portion of the separator 20. The cooling water flows through the convex portion adjacent to the concave portion on the front side which constitutes the gas flow passage, which means that the cooling water flow passage is formed of the concave portion on the back side. The cooling water is then discharged from the cooling water outlet manifold 62 of the left circumferential portion of the separator 20. More specifically, although the gas flow enters from the hydrogen gas inlet manifold 50, flows from the upstream segment to the midstream segment and the downstream segment, and is discharged from the hydrogen gas outlet manifold 52, the cooling water does not meander in this manner, and it flows from the cooling water inlet manifolds 60, flows through the upstream, midstream, and downstream segments of the cooling water flow passage, and is discharged from the cooling water outlet manifolds 62. In the present embodiment, the gas flow passage is the serpentine flow passage, but the cooling water flow passage is a straight flow passage. There are dimple arrays 66 along the vertical direction between the cooling water inlet/outlet manifolds 60 and 62 and the cooling water flow passage, to make adjustments so that the cooling water flow is almost constant. Further, air inlet/outlet manifolds 70 and 72 are formed on the upper and lower circumferential portions of the separator 20.

The width of the concave portion of the upstream segment of the gas flow passage is set to be relatively larger than that of the concave portion of the midstream segment. In addition, the width of the concave portion of the downstream segment of the gas flow passage is set to be relatively smaller than that of the concave portion of the midstream segment. On the other hand, the width of the convex portion of the upstream segment of the gas flow passage is set to be relatively smaller than that of the convex portion of the midstream segment. The width of the convex portion of the downstream segment is set to be relatively larger than that of the convex portion of the midstream segment. Specifically, the width of the concave portion in the upstream segment (flow passage width) is 1.20 mm; the width of the concave portion in the midstream segment is 1.12 mm; and the width of the concave portion in the downstream segment is 1.04 mm. Further, the width of the convex portion in the upstream segment is 0.34 mm; the width of the convex portion in the midstream segment is 0.42 mm; and the width of the convex portion in the downstream segment is 0.50 mm. Of course, these numerical numbers of the widths are mere examples, and, for example, the width of the concave portion 22 in the upstream segment may be 1.02 mm; the width of the concave portion 22 in the midstream segment may be 0.95 mm; and the width of the concave portion 22 in the downstream segment may be 0.88 mm.

As described, according to the present embodiment, in the separator on which the gas flow passage and the cooling water passage are formed on the front and back sides thereof, the further downstream the gas flow passage is, the smaller the cross-sectional area of the gas flow passage becomes, and the larger the cross-sectional area of the cooling water flow passage becomes. Thus, pressure loss is reduced in the upstream segment, and the generated water is allowed to move to the downstream segment, thereby improving the wet state of the membrane. In other words, by making the cross-sectional area of the gas flow passage relatively larger in the upstream segment of the gas flow passage, it is possible to reduce pressure loss and allow the generated water, which exists in the upstream segment of the gas flow passage, to flow to the downstream side, thereby effectively suppressing flooding, which is caused when the generated water accumulates in the flow passage and narrows the flow passage, and suppressing the shortage of the generated water in the downstream segment. Further, by making the cross-sectional area of the gas flow passage smaller in the downstream segment, that is, by making the cross-sectional area of the cooling water flow passage larger in the downstream segment, it is possible to prevent drying and suppress drying-up in the downstream segment, especially under high temperature operation. Because, in the present embodiment, the generated water is delivered from the upstream segment to the downstream segment more reliably than ever before, the heat transfer efficiency increases, and the drying-up suppressing effect is significant.

Although, in the present embodiment, the serpentine flow passage is exemplified as the gas flow passage of the separator 20, the present invention is not limited to this, and can be applied to a straight flow passage without curves. In the straight flow passage, the concave portions 22 are formed on a straight line from the gas inlet toward the gas outlet. The straight flow passage is divided into two segments, i.e. an upstream segment and a downstream segment, or three segments, i.e. an upstream segment, a midstream segment, and a downstream segment. The setting is made such that the further downstream the flow passage is, the smaller the width of the concave portion 22 is, and the larger the width of the convex portion 24 is.

Further, although, in the present embodiment, the width of the concave portion 22, that is, the cross-sectional area of the concave portion 22, is changed in the upstream segment, the midstream segment, and the downstream segment, the width of the concave portion 22 in the upstream segment and the midstream segment may be equal, and only the width of the concave portion 22 in the downstream segment may be made relatively smaller. In this case, the widths of the convex portions 24 in the upstream segment and the midstream segment are equal, and only the width of the convex portion 24 in the downstream segment is made relatively larger. Further, the widths of the concave portion 22 in the midstream segment and the downstream segment may be equal, and only the width of the concave portion 22 in the upstream segment may be made relatively larger. In this case, the widths of the convex portion 24 in the midstream and the downstream segments are equal, and only the width of the convex portion 24 in the upstream segment is made relatively smaller.

Further, in the present embodiment, the concave flow passage is formed on the separator 20 on the anode side, and the porous body flow passage made of the porous body layer 34 is formed on the cathode side, if the cathode side has a press separator which is similar to the separator 20, but not the porous body layer 34, the width of the concave portion 22 and the width of the convex portion 24 of this cathode-side press separator may also change on the upstream side and the downstream side, as on the anode side.

Further, although, in the present embodiment, the widths of the concave portion 22 and the convex portion 24 are changed while maintaining a constant pitch between them, the pitch does not always have to be constant, and it may also be changed while changing the widths of the concave portion 22 and the convex portion 24. If $\alpha=\beta$ holds true in the above description, that indicates that the pitch is constant, while, if $\alpha$ differs from $\beta$, that indicates that the pitch changes.

REFERENCE NUMERALS

10 MEA, 12, 14 GAS DIFFUSION SHEET, 20, 30 SEPARATOR, 34 POROUS BODY LAYER, 22 CONCAVE PORTION, 24 CONVEX PORTION.

The invention claimed is:

1. A fuel cell comprising:
a membrane electrode assembly; and
a separator located on one side of the membrane electrode assembly, the separator having concave and convex shapes formed on a front side and a back side of a single plate of the separator, the separator having a gas flow passage formed as a concave portion from said concave shapes on the membrane electrode assembly side and a coolant flow passage formed as a concave portion from said convex shapes on the side opposite to the membrane electrode assembly, wherein
a width of each of the concave portions constituting the gas flow passage of the separator is set such that it becomes relatively smaller on a gas downstream side than on a gas upstream side, and a width of each of the concave portions constituting the coolant flow passage of the separator is set such that it becomes relatively larger on a coolant downstream side than on a coolant upstream side so that the cross-sectional area of the gas flow passage decreases on the gas upstream side and the cross-sectional of the coolant flow passage increases on the coolant upstream side.

2. The fuel cell according to claim 1, wherein the gas flow passage is a straight flow passage with a gas inlet and a gas outlet that are disposed on a straight line.

3. The fuel cell according to claim 1, wherein the gas flow passage is a serpentine flow passage.

4. The fuel cell according to claim 1, wherein the separator is installed on the anode side, and a porous body flow passage is formed on the cathode side.

5. The fuel cell according to claim 1, wherein the separator is installed on the anode side, and a flow direction of the gas flow passage on the anode side is opposite to a flow direction of the gas flow passage on the cathode side.

* * * * *